Sept. 25, 1962  J. M. REID ETAL  3,055,209
METHOD FOR LOCATING LEAKS IN UNDERGROUND GAS CONDUITS
Filed Nov. 18, 1959
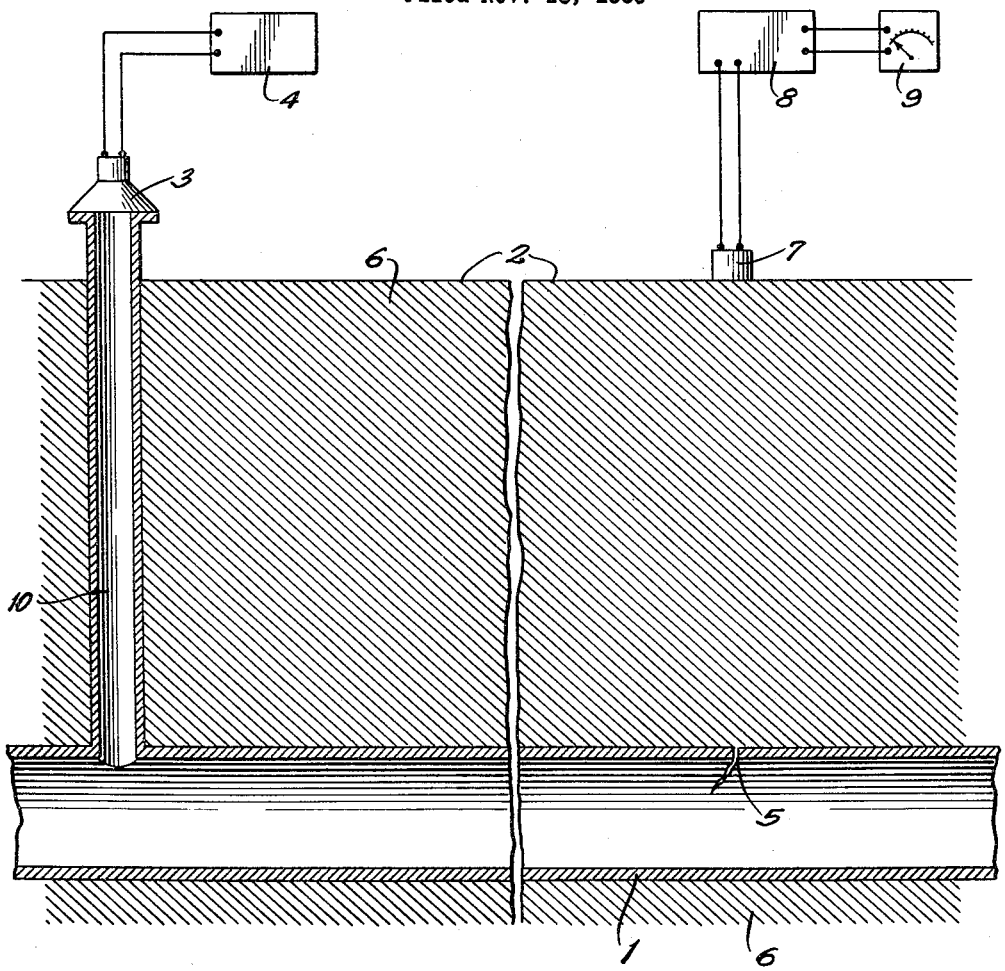
INVENTOR:
Jack M. Reid
and Paul L. Michael,
BY Bair, Freeman & Molinare
ATTORNEYS.

United States Patent Office 3,055,209
Patented Sept. 25, 1962

3,055,209
METHOD FOR LOCATING LEAKS IN UNDERGROUND GAS CONDUITS
Jack M. Reid, Villa Park, Ill., and Paul L. Michael, University Park, Pa., assignors, by mesne assignments, to American Gas Association, New York, N.Y., a corporation of New York
Filed Nov. 18, 1959, Ser. No. 853,798
5 Claims. (Cl. 73—69)

This invention relates to an improved method and apparatus for locating gas leaks in underground pipes. Many methods have been proposed heretofore for this purpose but have been less than satisfactory because they are not capable of locating the leak precisely or they are time-consuming, or both. It will be appreciated that gas leakage constitutes a public hazard as well as considerable loss to the utility company and that it is imperative that the leak be located and repaired promptly.

The most common prior art method of locating leaks, when gas has been detected in an area, consists of drilling or punching holes through the earth or paving above the pipe and determining the concentration of combustible gas with a suitable instrument. Drilling the large number of holes necessary to locate the leak is very time-consuming. In addition, the results are often misleading. Unnecessary excavation is done where large areas of soil are saturated with gas or where underground faults or other buried ducts convey the gas through the soil some distance from the actual point of leakage. Other prior art methods of gas leak location require that the pipe be exposed by excavation and then cut or tapped while live so that a suitable device can be inserted into the pipe such as a device which detects pressure changes. Other devices operate on the principle of detecting the sound produced by the escape of the gas through the opening in the pipe.

The object of the present invention is to obviate the disadvantages of these prior art methods of leak location and provide an improved method and apparatus which requires no excavation prior to repair, which is simple in construction and operation, and which is economical to build. The method of the invention consists in generating a sonic wave within the pipe carrying the gas. The gas column within the pipe carries the wave. The leak or opening through which gas escapes serves as a convenient path for the sonic waves being transmitted through the pipe and produces an unexpectedly high intensity at the surface of the ground above the leak. The contrast between the sound intensity at the point where the gas is escaping and other points along the length of the pipe is so sharp that by measuring the sound intensity along the pipe, the point of maximum intensity can be very accurately located.

The apparatus of the invention comprises a transmitter disposed within the pipe for generating sonic waves, a suitable pick-up which is movable along the surface of the ground parallel to the pipe, and a frequency selective means for amplifying and indicating the intensity of the signal sensed by the pick-up.

The apparatus of the invention is illustrated diagrammatically in the accompanying drawing.

A standard pipe 1, containing a leak 5, is buried beneath the surface of the ground 2 and carries a stream of natural gas or the like under slight pressure. A suitable transmitter is disposed at the end of the branch pipe 10 and comprises a transducer 3 and some sort of a sound generator indicated at 4. The branch pipe 10 communicates directly with pipe 1. The generating apparatus is well known in the art and is capable of generating sound waves in any desired range of wave lengths. If desired, a pneumatic sound generator, such as a whistle or siren, can be used. For the particular purpose of the invention it is desirable to use a generating apparatus which emits waves in the sonic range, say 25 to 20,000 cycles per second. The preferred lower limit is about 600 cycles per second. Above this frequency, the ambient noises normally present in city streets will not be masked with the sound being detected. If the waves are modified so as to be readily distinguishable from the ambient noise, frequencies lower than 600 c.p.s. can be used satisfactorily. The upper limit on the frequency is not critical, but we prefer to use frequencies below about 10,000 cycles per second. Lower frequencies in this range are preferred since they traverse great distances using a relatively small sound source. Ultrasonic frequencies are not suitable because they are too rapidly attenuated in the pipe and in the soil, thereby reducing their useful range below practical limits. The generator is preferably designed to transmit signals within a single octave range within the broad range specified and comprises one or more pure tones.

The leak in the pipe is designated in the drawing by the numeral 5 and it will be obvious that gas flows, under the pressure prevailing in the pipe, through the opening 5 and permeates through the earth 6. It is to be understood that it is not necessary that gas be flowing in order to practice this invention, but only that an opening be present in the pipe through which gas could flow. A suitable receiver consists of a transducer 7 capable of picking up sound waves, a frequency selective amplifying means 8, and an indicator 9. The receiver can be of either electrical or acoustical type and both types are well known in the art. It is desirable that the receiver be tuned so that it is sensitive only to the wave length being transmitted.

The pick-up is then moved in contact with the surface of the earth parallel to the length of pipe. As soon as the pick-up is disposed directly above the leak, the sound intensity measured by the indicator rises very sharply and falls off very rapidly on either side of the point where the leakage occurs.

In order to free the apparatus from any adverse effects due to extraneous noises, a coded signal such as a repetitive dot-dash pattern may be generated. The receiver is designed to sense only the coded signal. Thus no ambient noises are indicated on the meter 9, but only the signal generated within the pipe. Similar results may be achieved by cross-correlation techniques.

To illustrate the preciseness with which the leak can be located in accordance with my method a two inch steel pipe was buried to a depth of one foot in soil. A hole, 0.056 inch in diameter, was drilled through the wall of the pipe to simulate a leak for gas from the pipe. The gas pressure inside the pipe was held at 10 inches water column. Under these conditions, the rate of gas flow through the leak was 8.9 s.c.f./hr. The sonic signal was transmitted on a 3 kilocycle wave length and the intensity of the sound at the surface was measured using a microphone in conjunction with an amplifier and a ⅙ octave band pass filter tuned to 3 kilocycles. The data set forth in Table I below illustrate how sharply the intensity of the sound increases as the microphone moves from a point just outside the point directly over the leak to the precise point above the leak.

*Table 1*

| Distance of Microphone From Point Immediately Above Leak, inches | Relative Sound Intensity at Surface | |
|---|---|---|
| | With no Sound Source | With 3 kc. Sound Source |
| −24 | 1 | 316 |
| 0 | 16 | 19,950 |
| +24 | 1 | 316 |

It can be seen from the data in Table I that the intensity of the sound generated by the escaping gas alone in this instance provides positive indication of the point on the surface directly above the leak. In practice, however, the sound produced by the escaping gas will often be too feeble to give such positive identification. It is also apparent from the data in Table I that in the preferred method of this invention the identification of the point on the surface is very pronounced. Obviously, since the level of the sound is controlled by the apparatus of this invention, the feebleness of the natural sound produced by the escaping gas is of no consequence.

The present invention provides a method and apparatus which is much more effective in precise location of leaks than the method which involves locating the leak by reason of the noise generated by the leak itself. Attempts have been made to improve these prior art systems by pulling a microphone through a pipe or driving metal rods into the earth so that contact can be made with the pipe to provide direct metal to metal contact between the microphone and the pipe wall. Obviously, this method is much more troublesome than that of the invention, especially from the standpoint of time consumption.

As pointed out, the present invention is capable of locating the leak very rapidly since it is not necessary to do excavating; nor is it necessary to provide pipes for dropping the microphone down to pipe through which the gas is flowing; nor is it necessary to drive metal rods through the earth to contact the pipe. It was entirely unexpected that the hole through which gas escapes should provide such an excellent carrier path for the sound waves generated within the pipe.

What we claim as new and desire to secure by Letters Patent of the United States is:

1. A method for the precise location of gas leaks from an underground pipe which comprises transmitting sonic waves through the gas column within said pipe to cause said waves to travel through the leak opening in said pipe, moving a sound detector responsive to the frequency of said sonic waves parallel with said pipe near the surface of the ground and measuring the intensity of the signal sensed by said detector to determine the point of maximum intensity along the length of said pipe, which point corresponds with said leak.

2. The method of claim 1 in which said sonic waves are disposed over a frequency band within the range of 25 to 20,000 cycles per second.

3. The method of claim 1 in which said sonic waves comprise a narrow band of less than an octave in width within the range of 25 to 20,000 cycles per second.

4. The method of claim 1 in which said sonic waves comprise one or more pure tones distinct from the ambient noises.

5. The method of claim 1 in which said sonic waves are coded and said detector is tuned to be responsive only to said coded signal.

References Cited in the file of this patent
UNITED STATES PATENTS

| 714,775 | Brown | Dec. 2, 1902 |
| 2,008,934 | Smith | July 23, 1935 |
| 2,521,745 | Pope | Sept. 12, 1950 |
| 2,757,533 | Wiley | Aug. 7, 1956 |
| 2,932,189 | Carlin | Apr. 12, 1960 |